(12) United States Patent
Prakah-Asante et al.

(10) Patent No.: US 10,726,641 B2
(45) Date of Patent: Jul. 28, 2020

(54) METHODS AND APPARATUS FOR EXTERNAL VEHICLE ILLUMINATION MANAGEMENT

(71) Applicant: Ford Global Technologies, LLC, Dearborn, MI (US)

(72) Inventors: Kwaku O. Prakah-Asante, Commerce Township, MI (US); Krishnaswamy Venkatesh Prasad, Ann Arbor, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/325,436

(22) PCT Filed: Aug. 24, 2016

(86) PCT No.: PCT/US2016/048318
§ 371 (c)(1),
(2) Date: Feb. 14, 2019

(87) PCT Pub. No.: WO2018/038715
PCT Pub. Date: Mar. 1, 2018

(65) Prior Publication Data
US 2019/0213805 A1 Jul. 11, 2019

(51) Int. Cl.
*G07C 5/00* (2006.01)
*G08B 21/18* (2006.01)
(Continued)

(52) U.S. Cl.
CPC .............. *G07C 5/008* (2013.01); *B60K 35/00* (2013.01); *B60K 37/06* (2013.01); *G07C 5/0825* (2013.01);
(Continued)

(58) Field of Classification Search
CPC .......... H04M 1/6075; H04M 1/72569; H04M 1/72577; H04W 4/40; H04W 4/90;
(Continued)

(56) References Cited

U.S. PATENT DOCUMENTS 6,445,287 B1 * 9/2002 Schofield ............ B60C 23/0401
340/442
7,005,977 B1 2/2006 Tengler et al.
(Continued)

FOREIGN PATENT DOCUMENTS

CN 2802557 8/2006
CN 102658792 9/2012
(Continued)

OTHER PUBLICATIONS

International Searching Authority, "International Search Report and Written Opinion," issued in connection with International Application No. PCT/US2016/048318, dated Oct. 26, 2016, 16 pages.
(Continued)

*Primary Examiner* — Daniel Previl
(74) *Attorney, Agent, or Firm* — Brandon Hicks; Hanley, Flight & Zimmerman, LLC (57) ABSTRACT

Methods and apparatus for external vehicle illumination management are disclosed herein. An example method includes receiving, at a first processor of a mobile device, vehicle data. The vehicle data is to be transmitted to the first processor from a second processor of a vehicle. The example method includes analyzing the vehicle data and mobile device data generated by the mobile device. The example method includes generating an alert for headlamp usage of the vehicle based on the analysis and presenting the alert via the mobile device.

21 Claims, 5 Drawing Sheets

(51) Int. Cl.
| | |
|---|---|
| *G08B 21/24* | (2006.01) |
| *G08B 1/00* | (2006.01) |
| *H04W 4/40* | (2018.01) |
| *B60K 35/00* | (2006.01) |
| *B60K 37/06* | (2006.01) |
| *G07C 5/08* | (2006.01) |
| *B60Q 9/00* | (2006.01) |
| *B60Q 1/04* | (2006.01) |

(52) U.S. Cl.
CPC ............. *G07C 5/0833* (2013.01); *G08B 1/00* (2013.01); *G08B 21/18* (2013.01); *G08B 21/24* (2013.01); *H04W 4/40* (2018.02); *B60K 2370/55* (2019.05); *B60K 2370/566* (2019.05); *B60K 2370/573* (2019.05); *B60Q 1/04* (2013.01); *B60Q 9/00* (2013.01)

(58) Field of Classification Search
CPC ..... H04W 4/80; G02B 27/021; B60R 16/037; G07C 2009/0019; G07C 2009/00865; G07C 2209/04; G07C 9/00571; G07C 9/00896; G08C 17/02
USPC .. 340/458, 459, 463–466, 488, 506, 538.15, 340/539.28, 568.1, 571, 641
See application file for complete search history.

(56) References Cited

U.S. PATENT DOCUMENTS

| | | | |
|---|---|---|---|
| 7,898,182 B2 | 3/2011 | Futamura | |
| 7,972,045 B2 | 7/2011 | Schofield | |
| 2002/0109583 A1* | 8/2002 | Losey | B60H 1/0065 340/5.72 |
| 2003/0152088 A1* | 8/2003 | Kominami | B60N 2/0248 370/401 |
| 2005/0134983 A1* | 6/2005 | Lynam | B60R 1/12 359/872 |
| 2009/0066532 A1* | 3/2009 | Kraus | G02B 27/021 340/691.4 |
| 2012/0136538 A1* | 5/2012 | Schepp | B60W 30/09 701/41 |
| 2013/0010483 A1* | 1/2013 | Ge | B60Q 1/115 362/460 |
| 2013/0335984 A1 | 12/2013 | Foltin | |
| 2014/0085472 A1* | 3/2014 | Lu | B60R 1/002 348/148 |
| 2014/0279707 A1 | 9/2014 | Joshua et al. | |
| 2015/0062935 A1 | 3/2015 | Braunberger | |
| 2016/0059777 A1* | 3/2016 | Malone | B60Q 1/525 340/426.1 |
| 2016/0288647 A1* | 10/2016 | Baur | B60Q 9/00 |

FOREIGN PATENT DOCUMENTS

| | | |
|---|---|---|
| CN | 103448727 | 12/2013 |
| EP | 2918446 | 9/2015 |
| WO | 2018038715 | 3/2018 |

OTHER PUBLICATIONS

The International Bureau of WIPO, "International Preliminary Report on Patentability," issued in connection with International Application No. PCT/US2016/048318, dated Feb. 26, 2019, 7 pages.

* cited by examiner

METHODS AND APPARATUS FOR EXTERNAL VEHICLE ILLUMINATION MANAGEMENT

FIELD OF THE DISCLOSURE

This disclosure relates generally to external vehicle illumination and, more particularly, to methods and apparatus for external vehicle illumination management.

BACKGROUND

External vehicle illumination systems include headlamps that provide for low-beam or high-beam headlights to light a path of the vehicle. In some vehicles, headlamp usage is controlled by a driver of the vehicle with respect to activation of the headlamps and/or selection between low-beam or high-beam headlights.

SUMMARY

An example method disclosed herein includes receiving, at a first processor of a mobile device, vehicle data. The vehicle data is to be transmitted to the first processor from a second processor of a vehicle. The example method includes analyzing the vehicle data and mobile device data generated by the mobile device. The example method includes generating an alert for headlamp usage of the vehicle based on the analysis and presenting the alert via the mobile device Another example method disclosed herein includes receiving, via a first processor of a mobile device, vehicle data. The vehicle data is to be transmitted to the first processor from a second processor of the vehicle. The example method includes identifying a pattern based on the vehicle data. The pattern is associated with a use of headlamps of the vehicle. The example method includes analyzing the vehicle data, the pattern, and mobile device data. In the example method, the mobile device data is to be generated by the mobile device. The example method includes generating an alert based on the analysis and outputting the alert via the mobile device.

An example apparatus disclosed herein includes a vehicle data receiver to receive first vehicle headlamp usage data from a first processor of a vehicle. The example apparatus includes a mobile device data receiver to receive mobile device data generated by a mobile device. The example apparatus includes an analyzer to analyze the first vehicle headlamp usage data, second vehicle headlamp usage data, and the mobile device data. The second vehicle headlamp usage data is received by the vehicle data receiver prior to the first vehicle headlamp usage data. The analyzer is to generate an alert for headlamp usage of the vehicle based on the analysis. In the example apparatus, at least one of the vehicle data receiver, the mobile device data receiver, or the analyzer is to be implemented via a second processor of the mobile device.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Headlamps of a vehicle provide for light to illuminate a driving path of the vehicle in low-light or dark conditions and/or during adverse weather conditions. In some vehicles, a driver of the vehicle manually turns on and off the headlamps. However, drivers may forget to turn on the headlamps of the vehicle and/or not realize that the headlamps should be turned on in view of current weather conditions such as rain or fog.

A driver controls a brightness of the headlights produced by the headlamps by selecting between low-beam headlights or high-beam headlights. High-beam headlights provide for increased visibility as compared to low-beam headlights when driving, for example, in rural areas at night. However, use of high-beam headlights can require additional power from the vehicle. Further, use of high-beam headlights is not recommended when driving past or approaching another vehicle because the brightness of the high-beam headlights interferes with the vision of the driver of the other vehicle. Thus, high-beam headlight usage is not recommended in high-traffic areas. However, a driver driving from a low-traffic area to a high-traffic area or from a poorly lit road to a well-lit road may forget to switch from the high-beam headlights to the low-beam headlights.

Equipping vehicles with automatic headlamp systems (e.g., headlamps that automatically turn on based on a light sensor in the vehicle) may increase the cost of the vehicle, which may not be affordable for some vehicle consumers. Further, automatic headlamp systems may not detect weather conditions (e.g., rain, fog, etc.) that warrant headlamp usage. Thus, automatic headlamp systems may not automatically turn on the headlamps and/or the high-beam headlights if the light sensor detects sufficient light despite weather conditions such as rain. Automatic headlamp systems may not alert drivers to potentially unwarranted use of high-beam headlights based on, for example, location of the vehicle.

Although automatic headlamp systems may increase the cost of the vehicle and/or may be limited with respect to alerts provided to the driver, drivers typically have a smart mobile device (e.g., a smartphone) with them when they are driving the vehicle. The mobile device generates data with respect to time of day (e.g., via a clock application), vehicle location using Global Positioning Satellite (GPS) data, and weather conditions (e.g., from a weather application using the GPS data). The mobile device also generates data indicative of ambient light conditions via photo-sensing capabilities of the mobile device (e.g., as part of a camera of the mobile device).

Example systems and methods disclosed herein provide for management of external vehicle illumination (e.g., headlamps) via a mobile device. Based on data generated by the mobile device such as vehicle location and weather conditions, the disclosed examples provide alerts to the driver with respect to headlamp usage via the mobile device. In some examples, the disclosed examples generate alerts based on data wirelessly received by the mobile device from the vehicle, such as an on-off status of the headlamps or a high-beam/low-beam status. The disclosed examples use a rules-based analysis to generate the alerts. For example, based on the time of day and ambient light conditions detected by the mobile device, the disclosed examples provide a reminder to the driver via the mobile device to turn on the headlamps. As another example, the disclosed examples can detect potentially unwarranted high-beam usage based on the headlamp status received from the vehicle and alert the driver via the mobile device. Thus, the disclosed examples capitalize on the capabilities of smart mobile devices to provide guidance to drivers with respect to headlamp usage.

The examples disclosed herein also monitor and learn driver habits with respect to headlamp usage. The disclosed examples use data received from the vehicle with respect to headlamp status to determine patterns in, for example, high-beam headlight usage such as duration of use. The disclosed examples use the learned headlamp usage patterns along with other variables such as a vehicle windshield wiper status, vehicle speed, weather conditions, etc. to generate alerts advising the driver with respect to headlamp usage via the mobile device. The disclosed examples can also send alerts (e.g., via email) to other stakeholders besides the driver, such as the vehicle owner, with respect to anomalous headlamp usage. Thus, the disclosed examples provide real-time headlamp usage guidance that is not available in vehicles that do not have automatic headlamp systems. In vehicles that have automatic headlamp systems, the disclosed examples provide additional usage guidance beyond that provided by the automatic headlamp systems.

Figure 1:
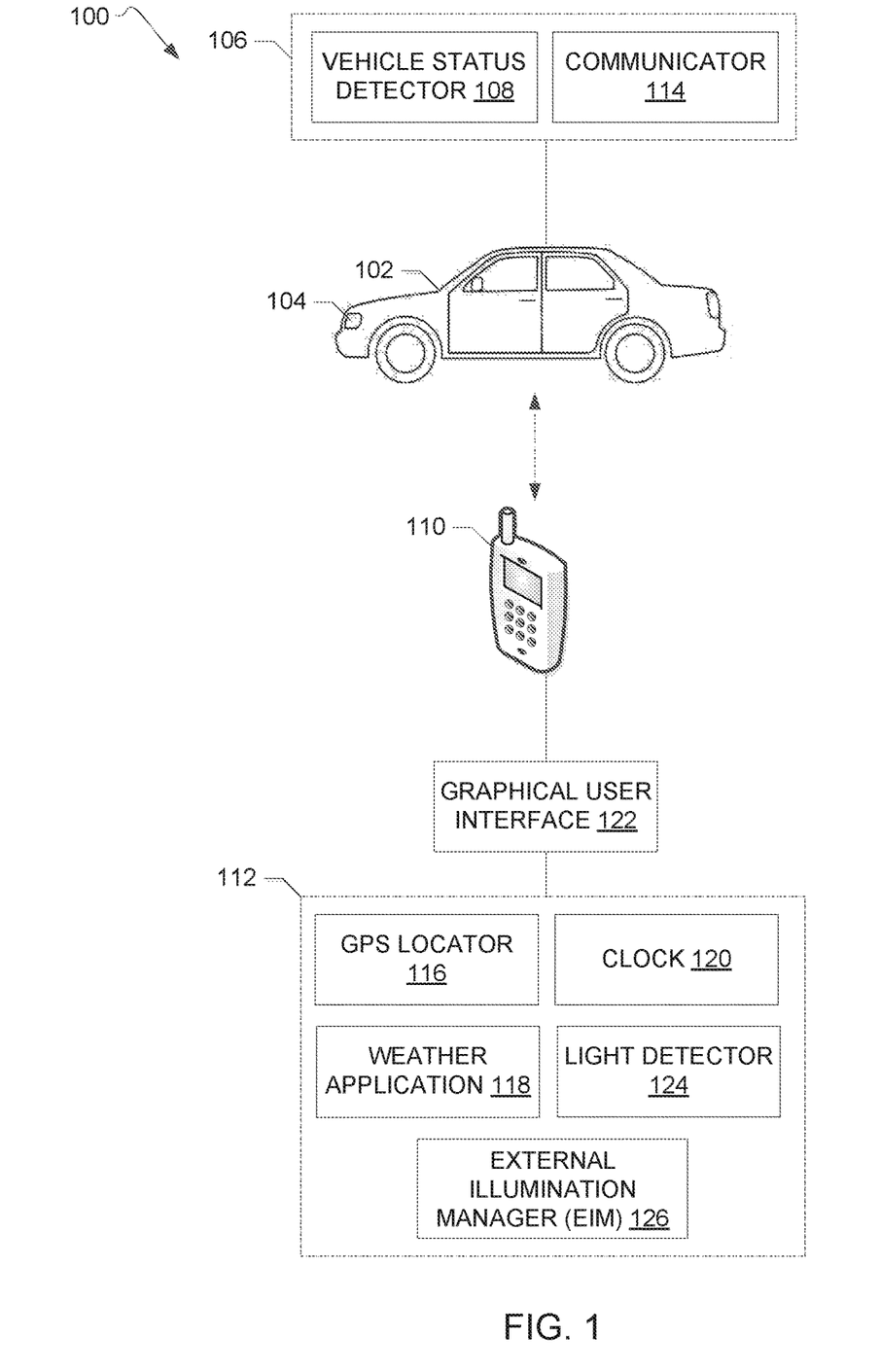
FIG. 1 illustrates an example system including an example vehicle and an example mobile device for management of external vehicle illumination of the vehicle in accordance with the teachings disclosed herein

An example system 100 for managing external illumination for a vehicle 102 having headlamps 104 is illustrated in FIG. 1. The example vehicle 102 includes a first processor 106. The first processor 106 includes a vehicle status detector 108. The vehicle status detector 108 collects data relating to the status of one or more components of the vehicle 102. For example, the vehicle status detector 108 identifies the status of headlamps 104 with respect to whether the headlamps 104 are on or off and/or whether the high-beam or low-beam headlights are selected (e.g., via communication with a CAN-bus of the vehicle 102). The vehicle status detector 108 also collects data such as a speed at which the vehicle 102 is travelling and whether or not the windshield wipers of the vehicle 102 are in use.

In the example system 100 of FIG. 1, the first processor 106 of the vehicle 102 is in wireless communication with a mobile device 110. Although one mobile device 110 is illustrated in FIG. 1, the first processor 106 of the vehicle 102 can communicate with additional mobile devices. The mobile device 110 can belong to, for example, a driver of the vehicle 102. The mobile device 110 of the example system 100 can be a smartphone, tablet, or other device having wireless communication capability. The mobile device 110 includes a second processor 112.

The first processor 106 of the vehicle 102 includes a communicator 114. In the example system 100, the communicator 114 transmits data collected by the vehicle status detector 108 to the second processor 112 of the mobile device 110 during use of the vehicle 102. In some examples, the communicator 114 transmits the data to the second processor 112 at predetermined intervals. For example, the communicator 114 can transmit the on-off status of the headlamps 104 to the second processor 112 every two minutes. In other examples, the communicator 114 transmits data to the second processor 112 when there is a status change. For example, the communicator 114 can transmit data to the second processor 112 indicating that the headlamps 104 have been turned on and then transmit data to the second processor 112 when the headlamps 104 are turned off. The data transmitted by the communicator 114 can be in the form of, for example, a data message indicating that the headlamps 104 have been activated. In other examples, the message includes data such as a time that the headlamps 104 were turned on and/or whether the high-beam or low-beam headlights were selected.

The second processor 112 of the mobile device 110 includes one or more applications that provide sensor data that can be used to provide guidance to the driver of the vehicle 102 with respect to usage of the headlamps 104. For example, the second processor 112 includes a GPS locator 116. The GPS locator 116 detects a location of the mobile device 110 via GPS satellite information. The second processor 112 of the example system 100 also includes a weather application 118. The weather application 118 provides information about weather conditions using, for example, the location data obtained by the GPS locator 116. The second processor 112 also includes a clock 120 that provides time and day information. The user of the mobile device 110 interacts with one or more of the applications of second processor 112 via a graphical user interface (GUI) 122. For example, the user can view the weather information from the weather application 118 via the GUI 122 of the mobile device 110.

The example second processor 112 of the mobile device 110 also includes a light detector 124. The light detector 124 receives data from one or more sensors of a camera (not shown) of the mobile device 110 with respect to ambient light conditions. For example, the light detector 124 can detect the mobile device 110 is in a low-light environment based on data received from one or more cameras.

The example second processor 112 also includes an External Illumination Manager (EIM) 126. In the example system 100 of FIG. 1, the EIM 126 processes data received from the vehicle status detector 108 and the sensor data received from the GPS locator 116, the weather application 118, the clock 120, and the light detector 124 to evaluate usage of the headlamps 104 by the driver of the vehicle 102 and to generate alerts with respect to headlamp usage for viewing by the driver via the GUI 122 of the mobile device 110. The EIM 126 can be installed by a user of the mobile device 110 (e.g., the driver of the vehicle 102).

Figure 2:
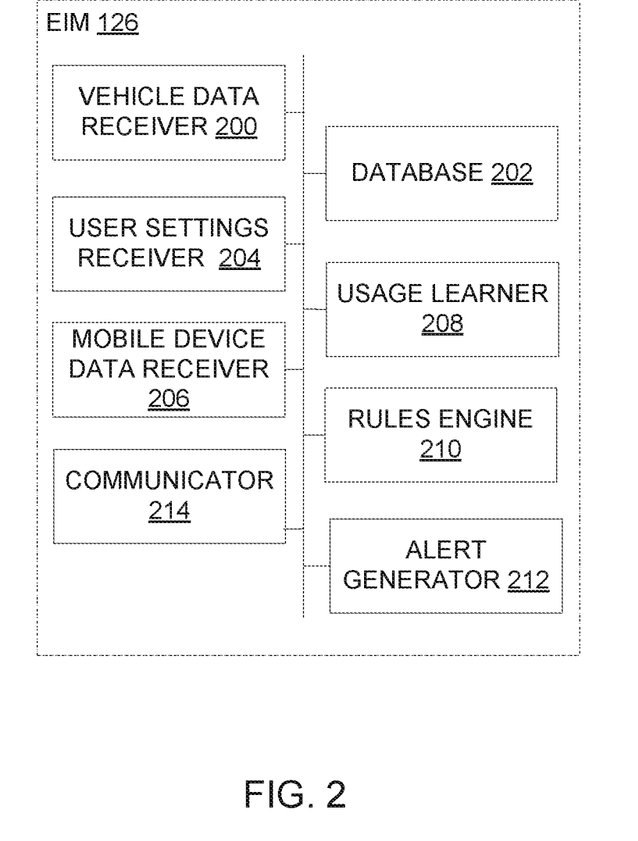
FIG. 2 is a block diagram of an example control system for use with the example mobile device of FIG. 1

FIG. 2 is a block diagram of the example EIM 126 of FIG. 1. The EIM 126 includes a vehicle data receiver 200. The vehicle data receiver 200 receives vehicle status data collected by the vehicle status detector 108 of the first processor 106 of the vehicle 102 and transmitted to the second processor 112 of the mobile device 110 via the communicator 114. For example, the vehicle data receiver 200 receives data regarding the on-off and/or the low-beam/high beam status of the headlamps 104 of the vehicle 102. The vehicle data receiver 200 also receives data regarding the operational status of the windshield wipers of the vehicle 102. The vehicle data receiver 200 can receive other vehicle status information such as the speed of the vehicle 102. The vehicle status data received by the vehicle data receiver 200 is stored in a database 202 of the EIM 126.

The EIM 126 includes a user settings receiver 204. The user settings receiver 204 receives one or more inputs provided by, for example, the driver of the vehicle 102 via the GUI 122 of the mobile device 110. For example, the driver can provide an input via the GUI 122 as to how frequently the driver wants to receive alerts from the EIM 126 with respect to headlamp usage. For example, the driver can select to receive alerts from the EIM 126 only during evening or night hours if the driver only wants to receive alerts during low-light times of day. In other examples, the driver can select to receive alerts from the EIM 126 during day and night hours to account for, for example, adverse weather conditions occurring during daylight hours.

The user settings receiver 204 can also receive one or more inputs with respect to other individuals to whom the EIM 126 should provide alerts. For example, as an owner of the vehicle 102, who can be different from the driver of the vehicle 102, may wish to receive alerts related to frequent high-beam headlight usage by the driver. The user settings receiver 204 can receive inputs from a user of the mobile device 110 (e.g., the vehicle owner, the driver) indicating what types of alerts should be sent to a stakeholder of the vehicle 102 (e.g., an owner of the vehicle 102, a guardian of the driver), how those alerts should be sent (e.g., via email, text message), and contact information for where the alerts should be sent. The user inputs received by the user settings receiver 204 are stored in the database 202.

The EIM 126 includes a mobile device data receiver 206. The mobile device data receiver 206 receives data from one or more of the GPS locator 116, the weather application 118, the clock 120, and the light detector 124 of the second processor 112 of the mobile device 110. For example, the mobile device data receiver 206 receives data such as the vehicle location from the GPS locator 116 and weather conditions from the weather application 118. The mobile device data receiver 206 receives time-of-day data from the clock 120 and ambient light conditions from the light detector 124. Thus, the mobile device data receiver 206 receives sensor data from the applications installed on the mobile device 110 with respect to conditions of the environment in which the mobile device 110 is located. The data received by the mobile device data receiver 206 is stored in the database 202.

The EIM 126 also includes a usage learner 208. The usage learner 208 analyzes the data received by the vehicle data receiver 200 and stored in the database 202 to detect patterns with respect to the usage of the headlamps 104 by the driver of the vehicle 102. The usage learner 208 determines a duration of usage of the headlamps 104 and/or a duration of the use of high-beam headlights. The usage learner 208 also calculates an average duration of the usage of the headlamps 104 and/or the average duration of the use of high-beam headlights for the driver.

For example, when the vehicle status detector 108 of the first processor 106 of the vehicle 102 detects that the headlamps 104 have been turned on, the communicator 114 of the first processor 106 transmits a message to the second processor 112 of the mobile device 110 indicating that the headlamps 104 are active. Upon receipt of the message indicating that the headlamps 104 have been turned on by the vehicle data receiver 200 of the EIM 126, the usage learner 208 generates a digital flag to indicate that the headlamps 104 are active. Upon generation of the digital flag indicating activation of the headlamps 104, the usage learner 208 activates a counter that counts based on an increment value (e.g., in time units) until the vehicle data receiver 200 receives a message from the communicator 114 of the vehicle 102 that the headlamps 104 have been turned off.

The usage learner 208 calculates a duration value based on the increment value of the counter.

For example, the duration value d_value can be found using Equation 1 below:

$$x(k)=x(k-1)+e \qquad \text{(Equation 1)},$$

where e is an increment value (e.g., in time units) for counting a duration of the headlamp usage (e.g., e=0.1 seconds).

The duration value d_value can be assigned a value within a range of 0-1 based on the increment value count at the time when the message that the headlamps 104 have been turned off is received. For example, the d_value is assigned a value closer to 0 for shorter durations of use of the headlamps 104 and the d_value is assigned a value closer 1 for longer durations of use of the headlamps 104 (e.g., relative to a predetermined threshold). The d_value is stored in the database 202. After the headlamps 104 are turned off, the counter is reset and the d_value is assigned a value of zero until the next message indicating activation of the headlamps 104 is received by the vehicle data receiver 200. When the next message is received indicating activation of the headlamps 104, the usage learner 208 calculates a duration value d_value based on the duration of the activation and stores the value in the database 202.

The usage learner 208 can also calculate a duration value for use of high-beam headlights. In such examples, the communicator 114 of the vehicle 102 transmits a message to the vehicle data receiver 200 that the high-beam headlight setting has been selected. The usage learner 208 generates a digital flag upon receipt of the message indicating that the high-beam headlights are active and triggers the incremental counter (e.g., via Equation 1, above). The usage learner 208 counts until a message received from the communicator 114 of the vehicle 102 indicates that the high-beam headlight setting has been turned off. A value from 0-1 is assigned to the duration value for the high-beam headlights based on the incremental counting during use of the high-beam headlights (e.g., relative to a predetermined threshold). The duration value for the high-beam headlights is stored in the database 202 and the counter is reset until the next time the high-beam headlight setting is selected by the driver and a message indicative of the selection is received by the vehicle data receiver 200. When the next message indicating selection of the high-beam headlight setting is received, the usage learner 208 calculates a duration value based on the duration of the activation and stores the value in the database 202.

The usage learner 208 analyzes the duration values for the usage of the headlamps 104 and/or the high-beam headlights (e.g., d_value) stored in the database 202. The usage learner 208 calculates an average user headlamp usage value by averaging the duration values d_value that are calculated for each instance in which the headlamps 104 are activated. In some examples, the usage learner 208 also calculates an average user high-beam usage value by averaging the duration values for the high-beam headlights determined for each instance in which the high-beam headlight setting is activated. Thus, the usage learner 208 generates user-specific metrics with respect to usage of the headlamps 104 based on data received from the vehicle 102 at different times corresponding to activation of the headlamps by the driver.

In some examples, the usage learner 208 considers data such as time-of-day information and weather conditions received by the mobile device data receiver 206 in evaluating the duration values. The usage learner 208 can also consider data such as windshield wiper status or vehicle speed received by the vehicle data receiver 200 to detect patterns in use of the headlamps 104. For example, the usage learner 208 can detect a pattern in a high-beam headlight duration value assigned a value close to 1, weather condition data indicating rain, and data indicating that the windshield wipers are activated to conclude that the driver uses the high-beam headlights during adverse weather. Thus, the usage learner 208 identifies patterns with respect to usage of the headlamps 104 based on the data received from the vehicle 102. The patterns detected by the usage learner 208 are stored in the database 202.

The duration values calculated by the usage learner 208 and the patterns identified based on the duration values are used by a rules engine 210 of the EIM 126 to determine whether to generate an alert with respect to headlamp usage. The rules engine 210 applies one or more rules based on data received from the usage learner 208, the vehicle data receiver 200, the user settings receiver 204, and/or the mobile device data receiver 206 to determine whether an alert should be generated with respect to usage of the headlamps 104. The rules applied by the rules engine 210 are stored in the database 202. If the rules engine 210 determines that an alert should be generated, the rules engine 210 communicates with an alert generator 212 of the EIM 126.

In some examples, the rules engine 210 considers the duration values calculated for the driver of the vehicle 102 relative to duration values calculated for other drivers (e.g., data collected from a sample population). For example, the database 202 can store an average standard high-beam headlight usage value representative of an average amount of time that high-beam headlights are used by a sample population. Based on the average standard high-beam headlight usage, the rules engine 210 calculates a High-Beam Anomaly value HBA. The High-Beam Anomaly value HBA can be found using Equation 2 below:

$$HBA=(x_i-y_i) \quad \text{(Equation 2)},$$

where:

$x_i$ is an average user high-beam headlight duration value as determined by the usage learner 208; and $y_i$ is an average standard high-beam headlight duration value (e.g., for a sample population).

Thus, the High-Beam Anomaly value HBA considers the average high-beam headlight usage of the driver of the vehicle 102 relative to high-beam headlight usage by other drivers. The High-Beam Anomaly value HBA indicates whether the driver uses high-beam headlights for a duration that is more than average, less than average, or substantially the same as other drivers. To determine a deviation of the average high-beam headlight usage by the driver of the vehicle 102 relative to other drivers, the rules engine 210 compares the High-Beam Anomaly value HBA to a threshold value γ.

The threshold value γ is a sensitivity threshold based on an allowed deviation of the high-beam headlight usage duration from the average standard high-beam headlight usage before the rules engine 210 determines that an alert should be generated to remind the driver of the vehicle 102 to turn off the high-beam headlight setting. The threshold value γ can be tuned or set for the driver based on patterns detected by the usage learner 208 with respect to the average duration value of high-beam headlight usage by the driver. For example, if the usage learner 208 detects that the driver uses the high-beam headlights for long durations (e.g., as compared to average use of the high-beam headlights by other drivers), the rules engine 210 assigns the threshold value γ a greater value than would otherwise be assigned if the driver uses the high-beam headlights for shorter durations on average. Thus, the threshold value γ is selected based on usage patterns for the driver to provide customized alerts with respect to anomalies in the driver's usage of the high-beam headlights.

The rules engine 210 evaluates data calculated by the usage learner 208 such as the average duration value of the high-beam headlights, data received from the vehicle data receiver 200 such as the operational state of the headlamps, and variables such as the high-beam anomaly value to determine whether an alert should be generated. For example, the rules engine 210 can apply a rule to determine whether an alert should be generated with respect to turning off the high-beam headlight setting or turning on the headlamps 104. The rule can be expressed using Equations 3 and 4 below:

$$\text{If}(d\_value \text{ is } >y_i, HBA=(x_i-y_i)>\gamma, \text{ and High-Beam-State is } j_i, \text{ and VS is } >z_i) \quad \text{(Equation 3)},$$

$$\text{Then, EIM-DM\_value}=m_i \quad \text{(Equation 4)},$$

where:

d_value: duration value determined by the usage learner 208;

HBA: High-Beam Anomaly value;

$x_i$: average user high-beam headlight duration value;

$y_i$: average standard high-beam headlight duration value;

γ: threshold value;

High-Beam State: $j_i$, 1=ON, 2=OFF (e.g., based on data received from the vehicle data receiver 200);

VS: speed of the vehicle 102 received by the vehicle data receiver 200;

$z_i$: vehicle speed threshold for usage of headlamps 104;

EIM-DM_value (External Illumination Manager—Decision-Making): $m_i$=(0, 1, or 2) where 0=no action, 1=turn-on lights alert, and 2=turn off high-beam headlight setting alert.

As disclosed above with respect to Equations 3 and 4, the rules engine 210 determines whether the High-Beam Anomaly value HBA is greater than the threshold value γ, thereby indicating an anomaly with respect to usage of the high-beam headlights by the driver (e.g., relative to an average duration of use of the high-beam headlights by the driver and/or other drivers). In determining whether an alert should be generated, the rules engine 210 also considers the speed of the vehicle. Thus, in determining whether to generate an alert, the rules engine 210 accounts for variables such as whether or not the high-beam headlight setting is activated (e.g., as received by the vehicle data receiver 200), the average use duration of the high-beam headlight usage by the driver (e.g., as determined by the usage learner 208), and the speed of the vehicle 102 (e.g., as received by the vehicle data receiver 200). Based on the analysis of the variables, the rules engine 210 determines whether an alert should be generated with respect to usage of the headlamps 104 and/or the high-beam setting (e.g., based on the EIM-DM_value).

In accounting for the average duration of use of the high-beam headlights by the driver and comparing the High-Beam Anomaly value HBA to the threshold value γ that is tuned based on the driver's headlamp usage, the rules engine 210 provides customized guidance to the driver. Thus, the rules engine 210 generates different alerts for each driver based on driver habits that are determined based on data collected for each driver and analyzed by the usage learner 208. If an average high-beam headlight duration value for the first driver is greater than for a second driver, the rules engine 210 assigns a higher threshold value γ to the first driver than the threshold value γ assigned to the second driver. In some examples, the higher threshold value γ indicates that the first driver deviates from an average high-beam headlight duration value more than the second driver. As such, the rules engine 210 may trigger an alert to the second driver to turn off the high-beam headlight setting sooner than the rules engine 210 triggers an alert for the first driver due to the rules engine 210 identifying an anomaly in the second driver's headlight usage sooner than the first driver based on the threshold value γ for the second driver.

Another example rule that can be employed by the rules engine 210 can be expressed using Equations 5 and 6 below:

If (time of day is $t_i$, and VS is $>z_i$) (Equation 5), then EIM-DM_value=$m_i$ (Equation 6).

where:

$t_i$: time-of-day;

VS, $z_i$, Hill-DM_value, and $m_i$ are as defined above with respect to Equations 3 and 4.

As illustrated by Equations 5 and 6, in some examples, the rules engine 210 applies rules based on variables such as time of day and vehicle speed. The time-of-day variable $t_i$ can be determined based on data received from the mobile device data receiver 206. For example, data generated by the clock 120 and/or the light detector 124 (e.g., ambient light conditions) can be used by the rules engine 210 in applying the rule with respect to usage of the headlamps at certain times of the day, such as at night-time. The vehicle speed data is received by the vehicle data receiver 200). Thus, the rules engine 210 integrates or aggregates vehicle data and mobile device data when applying the decision-making rules.

The rules engine 210 can consider other variables received by the vehicle data receiver 200 and/or the mobile device data receiver 206 to determine whether an alert should be generated. The rules engine 210 can account for weather conditions received by the mobile device data receiver 206 from the weather application 118 of the mobile device 110. For example, a condition can be added to the rule(s) applied by the rules engine 210 that if weather_state=1, then the rules engine 210 recognizes that the vehicle 102 is traveling in adverse weather conditions such as rain based on the data received by the mobile device data receiver 206. In some examples, the rules engine 210 also recognizes that the vehicle is travelling in adverse weather conditions based on the status of the windshield wipers received by the vehicle data receiver 200. The rules engine 210 can account for the weather data when applying the rule(s) and/or adjust the output of one or more rules based on the weather data. For example, if adverse weather conditions are detected, the rules engine 210 may adjust the vehicle speed threshold for determining whether the headlamps 104 should be turned on (e.g., VS is $>z_i$). Thus, the rules engine 210 provides for real-time decision-making and adaptively responds to data received from the vehicle data receiver 200, the user settings receiver 204, mobile device data receiver 206, and the usage learner 208.

If the rules engine 210 determines that an alert should be generated with respect to usage of the headlamps 104, the rules engine 210 sends a message to the alert generator 212 of the EIM 126. The alert generator 212 generates an alert based on the determination of the rules engine 210. In some examples, the alert generator 212 generates the alert based on the user settings received by the user settings receiver 204. For example, based on the user settings, the alert generator 212 may generate an alert to be displayed via the GUI 122 of the mobile device 110 of the driver and an email to be sent to an individual other than the driver (e.g., an owner of the vehicle 102).

The alert(s) generated by the alert generator 212 can include, for example, a message to the driver recommending that the driver turn on the headlamps 104. Another example message can include a message to the driver that the high-beam headlights have been on for an extended period of time. The alert(s) generated by the alert generator 212 can include text, graphics, and/or audio. In some examples, an alert includes a message to an individual other than the driver indicating that the high-beam headlights have been on for an extended period of time.

The EIM 126 includes a communicator 214 to deliver the alert(s) generated by the alert generator 212 for presentation to the driver and, in some examples, other stakeholders. For example, the communicator 214 can instruct the second processor 112 of the mobile device 110 to display the alert via the GUI 122 as, for example, a text message. In other examples, the communicator 214 instructs the second processor 112 to present the alert as an audio alert via speakers of the mobile device 110. In other examples, the communicator 214 instructs the second processor 112 of the mobile device 110 to send an email and/or text message to an individual other than the driver based on the user settings. The generation of the alert(s) by the alert generator 212 and/or the delivery of the alert(s) by the communicator 214 is based on the user settings with respect to how frequently the driver wants to receive the alerts.

As disclosed above, in some examples, the EIM 126 receives data from the vehicle 102 via the vehicle data receiver 200 with respect to vehicle speed, operational status of the headlamps 104, windshield wiper status, etc. In such examples, the vehicle data is integrated with mobile device data to determine whether to generate one or more alerts regarding the use of the headlamps 104 via the decision-making rules (e.g., Equations 1-6). In other examples, the EIM 126 does not receive data from the vehicle 102. For example, the vehicle 102 may not include wireless capabilities to transmit the data to the mobile device 110. In such examples, the EIM 126 can generate alerts based on the mobile device data received via the mobile device data receiver 206 and without the data from the vehicle 102.

As disclosed above, the mobile device 110 generates sensor data with respect to GPS location, ambient light conditions, time of day, etc. For example, the light detector 124 of the mobile device 110 can detect that the mobile device 110 is in a low-light environment and transmit a message to the EIM 126 indicating that the mobile device 110 is in a low-light environment. Also, the clock 120 of the mobile device 110 can transmit the time to the EIM 126, which can indicate that the time of day is night. Based on the data received by the mobile data device receiver 206 from the light detector 124 and/or the clock 120 indicating low-light conditions, the rules engine 210 can determine that an alert should be generated to prompt the driver to check that headlamps 104 are turned on. The alert generator 212 can generate the alert for presentation via the mobile device 110 (e.g., for display on the GUI 122 of the mobile device 110 or as audio message) via the communicator 214. Thus, the rules engine 210 of the EIM 126 can determine whether alerts should be generated using rules that are based on the data generated by the mobile device 110 and without receiving data from the vehicle 102.

As another example, the rules engine 210 can consider location data generated by the GPS locator 116 of the mobile device 110 and received by the mobile device data receiver

206. For example, if the rules engine 210 detects that the vehicle 102 is in a rural area based on the mobile device GPS location data, the rules engine 210 can determine that an alert should be generated to prompt the driver to check that the headlamps 104 are activated. As another example, if the rules engine 210 detects that the vehicle 102 is in a high-traffic area based on the mobile device GPS data, the rules engine 210 determines that an alert should be generated to prompt the driver to check that the high-beam headlight setting is turned off. The alert generator 212 can generate the alert(s) for presentation via the mobile device 110 (e.g., for display on the GUI 122 of the mobile device 110 or as audio message) via the communicator 214.

Thus, the EIM 126 can be a stand-alone application that generates alerts based on data generated by the mobile device 110 without receiving data from the vehicle 102. In such examples, the alerts generated by the EIM 126 serve as prompts for the driver to check the status of the headlamps 104 and/or the high-beam headlights. Thus, in examples where data from the vehicle 102 cannot be received, the EIM 126 can still provide guidance to the driver with respect to usage of the headlamps 104.

Figure 3:
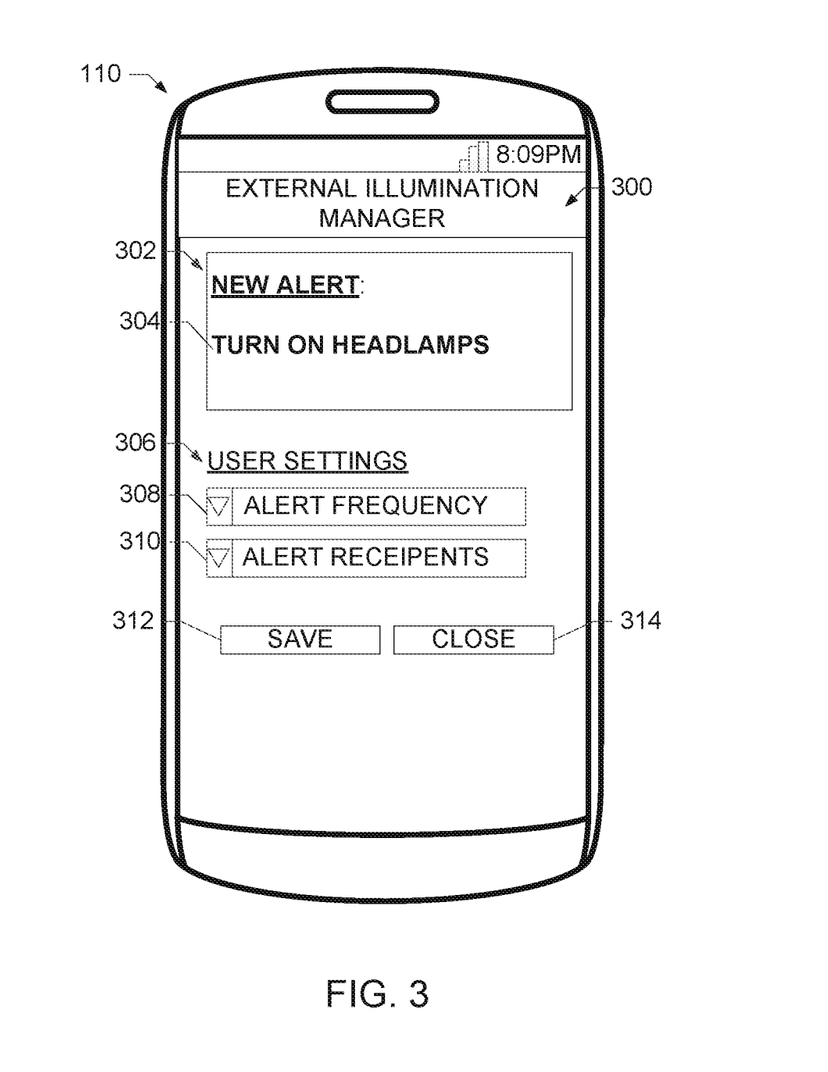
FIG. 3 illustrates an example screen of a graphical user interface associated with the example mobile device of FIG. 1

FIG. 3 illustrates an example screen 300 of the example GUI 122 of the mobile device 110 of FIG. 1 for displaying an alert generated by the EIM 126. The example screen 300 can be displayed when the EIM 126 is in operation (e.g., by the user of the mobile device 110 (e.g., the driver of the vehicle 102) selecting to run the EIM 126). In some examples, the example screen 300 is automatically displayed when the EIM 126 generates an alert (e.g., based on an instruction output by the communicator 214 of the EIM 126). In other examples, a preview and/or a notification of the alert(s) is generated by the alert generator 212 of the EIM 126 for display via the GUI 122 or for presentation as an audio notification.

The example screen 300 includes an alert field 302. The alert field 302 displays one or more alerts generated by the EIM 126. As illustrated in FIG. 3, an alert 304 is displayed in the alert field 302 in the form of a text message (e.g., "turn on headlamps"). In other examples, the alert 304 can include a graphic (e.g., an image of a lightbulb). In some examples, the alert 304 includes audio (e.g., played via a media player installed on the mobile device 110). As disclosed above, after the rules engine 210 of the EIM 126 determines that an alert should be generated, the alert generator 212 generates the alert and the communicator 214 of the EIM 126 instructs the second processor 112 of the mobile device 110 to present the alert via, for example, the screen 300 of FIG. 3.

The example screen 300 includes a user settings field 306. The user settings field 306 allows the user of the mobile device 110 (e.g., the owner of the vehicle 102, the driver of the vehicle 102) to input one or more settings with respect to the EIM 126. For example, the user settings field 306 includes an alert frequency menu 308. The alert frequency menu 308 allows the user of the mobile device 110 to select a frequency at which the EIM 126 provides the alerts 304 to the user (e.g., the driver of the vehicle 102). For example, the user can select to receive the alerts 304 only at a certain time of day (e.g., at night) or at all hours of the day.

The user settings field 306 of the example screen 300 also includes an alert recipients menu 310. As disclosed above, in addition to displaying the alert(s) 304 via the GUI 122 of the mobile device 110 to provide reminders to the driver of the vehicle 102, the EIM 126 can send alerts to other stakeholders such as the owner of the vehicle 102 (if different than the driver) or a guardian of the driver with respect to headlamp usage by the driver. The alert recipients menu 310 allows the user to input information such as contact information and a format for delivering the alert(s) 304 (e.g., email, text message) to the stakeholder(s).

The user settings field 306 can include other menus to provide customized alerts to the driver with respect to headlamp usage. For example, the user settings field 306 can include menus for selecting a type of alert (e.g., audio, visual) to be presented by the EIM 126. Also, the example screen 300 can include additional or fewer fields than illustrated in FIG. 3 and/or include fields arranged in a different layout or formats (e.g., dropdown menus, overlay screens, etc.). The example screen 300 includes a save button 312 to save changes to, for example, the user settings field 306 and a close button 314 to close the example screen 300 after, for example, the driver is done driving.

In some examples, one or more portions of the example screen 300 are presented via another application installed on the mobile device 110. For example, the alert field 302 including the alert 304 can be presented via a text messaging application, an email application, and/or an audio media player in addition to or as an alternative to being displayed via the example screen 300. In some examples, the alert 304 includes an audio component that is output via an audio media player of the mobile device 110 and a visual component (e.g., text) that is displayed via the GUI 122 of the mobile device 110 (e.g., via the example screen 300 of FIG. 3). In other examples, the alert 304 is presented only as an audio alert and the user settings field 306 is viewed via the example screen 300. In such examples, the user settings field 306 can include options with respect to audio notifications generated by the EIM 126. In other examples, the alert field 302 can be displayed via a text messaging application installed on the mobile device 110 while the user settings field 306 is accessed via the example screen 300 of the EIM 126 shown in FIG. 2. Thus, the EIM 126 provides for customized alerts based on patterns in headlamp usage for a respective driver as well as customized presentation of the alerts.

While an example manner of implementing the example system 100 is illustrated in FIGS. 1-3, one or more of the elements, processes and/or devices illustrated in FIGS. 1-3 may be combined, divided, re-arranged, omitted, eliminated and/or implemented in any other way. Further, the example first processor 106, the vehicle status detector 108, the mobile device 110, the communicator 114, the second processor 112, the GPS locator 116, weather application 118, clock 120, light detector 124, the EIM 126, the vehicle data receiver 200, the database 202, the user settings receiver 204, the mobile device data receiver 206, the usage learner 208, the rules engine 210, the alert generator 212 and/or, more generally, the example system 100 of FIGS. 1-3 may be implemented by hardware, software, firmware and/or any combination of hardware, software and/or firmware. Thus, any of the example first processor 106, the vehicle status detector 108, the mobile device 110, the communicator 114, the second processor 112, the GPS locator 116, weather application 118, clock 120, light detector 124, the EIM 126, the vehicle data receiver 200, the database 202, the user settings receiver 204, the mobile device data receiver 206, the usage learner 208, the rules engine 210, the alert generator 212 and/or, more generally, the example system 100 of FIGS. 1-3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, first processor 106, the vehicle status detector 108, the mobile device 110, the communicator 114, the second processor 112, the GPS locator 116, weather application 118, clock 120, light detector 124, the EIM 126, the vehicle data receiver 200, the database 202, the user settings receiver 204, the mobile device data receiver 206, the usage learner 208, the rules engine 210, the alert generator 212 and/or, more generally, the example system 100 of FIGS. 1-3 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIGS. 1-3 may include one or more elements, processes and/or devices in addition to, or instead of, those illustrated in FIGS. 1-3, and/or may include more than one of any or all of the illustrated elements, processes and devices.

Figure 4:
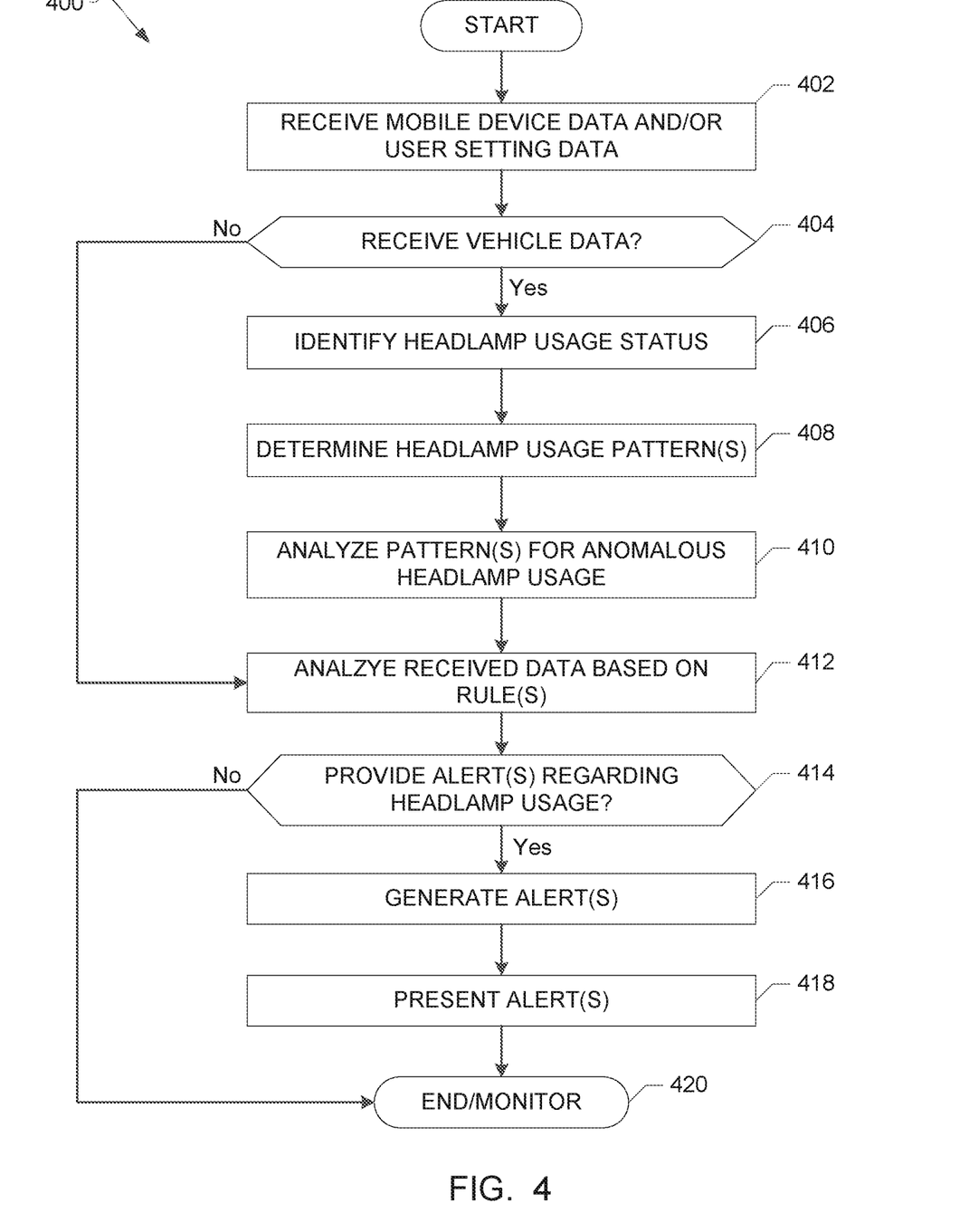
FIG. 4 is a flow diagram of a method that may be executed to implement the example system of FIG. 1.

FIG. 4 illustrates a flowchart representative of an example method 400 that can be implemented to automatically generate alerts with respect to vehicle headlamp usage via an external illumination manager (EIM) of a mobile device. The example method 400 can be implemented using the EIM 126 of the mobile device 110 of FIGS. 1-3 to provide alerts with respect to usage of the headlamps 104 of the vehicle 102 via the mobile device 110.

The example method 400 begins with receiving mobile device data and user setting data (block 402). The mobile device data can be received by the mobile device data receiver 206 of the EIM 126 of FIGS. 1-3. The mobile device data can include, for example, time-of-day information, weather information, GPS information, and/or ambient light conditions from one or more applications installed on the mobile device 110 (e.g., the GPS locator 116, the weather application 118, the clock 120, the light detector 124). The user setting data can be received by the user settings receiver 204 of the EIM 126. The user setting data can include, for example, a frequency at which the user of the mobile device 110 (e.g., the driver of the vehicle 102) would like to receive alerts from the EIM 126. The data received by the mobile device data receiver 206 and/or the user settings receiver 204 is stored in the database 202 of the EIM 126.

The example method 400 includes a determination of whether or not data is received from a vehicle (block 404). In some examples, a vehicle such as the vehicle 102 of FIG. 1 includes wireless transmission technology to transmit data to a mobile device such as the mobile device 110 of FIGS. 1-3. For example, the communicator 114 of the vehicle 102 can send vehicle data collected by the vehicle status detector 108 to the mobile device 110. Data received from the vehicle 102 can include an operational status of the headlamps 104, speed of the vehicle 102, etc. The data transmitted by the vehicle 102 is received by the vehicle data receiver 200 and stored in the database 202 of the EIM 126.

If data is received from the vehicle, the example method 400 includes identifying a status of the headlamps of the vehicle (block 406). For example, the data received by the vehicle data receiver 200 from the vehicle status detector 108 of the vehicle 102 can include a message that the headlamps 104 have been activated. The vehicle status detector 108 can also send a message that the high-beam headlight setting of the headlamps 104 has been activated. Based on the data indicating that the headlamps 104 and/or the high-beam headlights have been activated, the usage learner 208 of the EIM 126 identifies that the headlamps 104 are in use.

The example method 400 continues with determining usage pattern(s) based on the status of the headlamps (block 408). For example, based on data received from the vehicle status detector 108 that the high-beam headlights are active, the usage learner 208 activates a counter to determine a duration of the high-beam headlight usage. The usage learner 208 turns off the counter when a message is received by the vehicle data receiver 200 that the high-beam headlight setting has been turned off. The usage learner 208 determines a duration value for the high-beam headlight usage based on the count value. The duration value is stored in the database 202. The usage learner 208 calculates an average user high-beam headlight duration value for the driver of the vehicle 102 based on the duration values stored in the database 202 to determine usage pattern(s) with respect to high-beam headlights for the driver.

The example method 400 includes analyzing the headlamp usage pattern(s) to detect anomalous headlamp usage (block 410). In the example method 400, the detection of anomalous headlamp usage is used to determine whether one or more alerts should be generated with respect to headlamp usage. For example, the rules engine 210 of the EIM 126 compares the average user high-beam headlight duration value to an average standard high-beam headlight duration value for a sample population to determine a headlight anomaly value (e.g., HBA, Equation 2, above). The rules engine 210 compares the headlight anomaly value to a sensitivity threshold (e.g., the threshold value γ) for the driver to determine an allowable deviation of the duration of the driver's high-beam headlight usage from the average duration of high-beam headlight usage for the sample population (e.g., Equation 3, above). Based on the comparison of the headlight anomaly value to the sensitivity threshold, the rules engine 210 determines whether the driver's high-beam headlight usage is anomalous relative to the driver's patterns with respect to high-beam headlight usage.

The example method 400 continues with analyzing data such as the mobile device data based on one or more rules (block 412). For example, the rules engine 210 analyzes data such as time-of-day and weather conditions to determine whether the headlamps 104 of the vehicle 102 should be activated. The rule(s) utilized by the rules engine 210 include, for example, rules with respect to usage of the headlamps 104 during adverse weather conditions, low-light conditions, etc. (e.g., Equations 4-6, above). In some examples, the rules engine 210 considers data received from the vehicle 102 such as vehicle speed and an operational status of the windshield wipers when implementing the rule(s). Thus, the example method 400 integrates the data received from the vehicle and the data generated by the mobile device when applying the one or more rules.

Based on the analysis of the headlamp usage patterns and other data received such as the mobile device data and the user setting data (e.g., alert frequency), the rules engine 210 determines whether one or more alerts should be provided to the driver with respect to headlamp usage (block 414). For example, the rules engine 210 can determine that an alert should be generated to remind the driver to turn off the high-beam headlights if the High-Beam Anomaly value HBA is greater than the threshold value and based on speed of the vehicle 102. In other examples, the rules engine 210 determines that an alert should be generated to remind the driver to turn on the headlamps based on time-of-day data and vehicle speed.

If a determination is made that one or more alerts should be provided to the driver, the example method 400 includes generating the alert(s) (block 416). The example alert generator 212 of the EIM 126 can generate one or more alerts including text, graphics, and/or audio. In some examples, the alert generator 212 generates alert(s) to be sent to one or more stakeholders other than the driver, such as the owner of the vehicle 102. The example method 400 includes presenting the alert(s) to the driver and, in some examples, other stakeholders (block 418). For example, the communicator 214 of the EIM 126 can instruct the second processor 112 of the mobile device 110 to output the alert(s) as a text message, an audio message, etc. After the alert(s) have been presented or if a decision is made that an alert is not required (block 414), the example method 400 ends with monitoring data received by the EIM 126 with respect to evaluating headlamp usage (block 420).

In some examples of the method 400, data is not received from the vehicle 102 (block 404). For example, the vehicle 102 may not include the communicator 114 of FIG. 1 to wirelessly transmit data collected by the vehicle status detector 108 to the mobile device 110. In such examples, although data such as headlamp status is not received from the vehicle 102, the example method 400 can be used to generate alerts with respect to headlamp usage.

As illustrated in the flow diagram of FIG. 4, if data is not received from the vehicle (block 404), the example method 400 proceeds with analyzing the data that is received, such as the mobile device data (block 412). For example, the rules engine 210 can determine whether an alert should be generated to prompt the driver to check the status of the headlamps based on mobile data including GPS location data (e.g., from the GPS locator), time-of day data (e.g., from the clock 120), weather condition data (e.g., from the weather application 118), and/or ambient light condition data (e.g., from the light detector 124). The example method 400 continues with generating and delivering alerts as disclosed above (e.g., blocks 414-420).

Thus, the example method 400 provides for automatically generating alerts with respect to headlamp usage. In examples where the vehicle 102 transmits data to the mobile device 110, the example method 400 includes determining and analyzing data patterns in headlamp usage for the driver. The vehicle data is analyzed with data generated by the mobile device to provide to provide customized alerts. In examples where data is not received from the vehicle 102, the example method 400 uses data generated by the mobile device to generate alerts that remind the driver to check the status of the headlamps 104. Thus, the example method 400 provides for a flexible method for providing guidance with respect to headlamp usage in view of available data about conditions in which the vehicle is travelling.

The flowchart of FIG. 4 is representative of an example method that may be used to implement the example system 100 of FIGS. 1-3. In this example, the method may be implemented using machine readable instructions that comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example system 100 may alternatively be used. For example, the order of execution of the blocks may be changed, and/or some of the blocks described may be changed, eliminated, or combined.

As mentioned above, the example processes of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
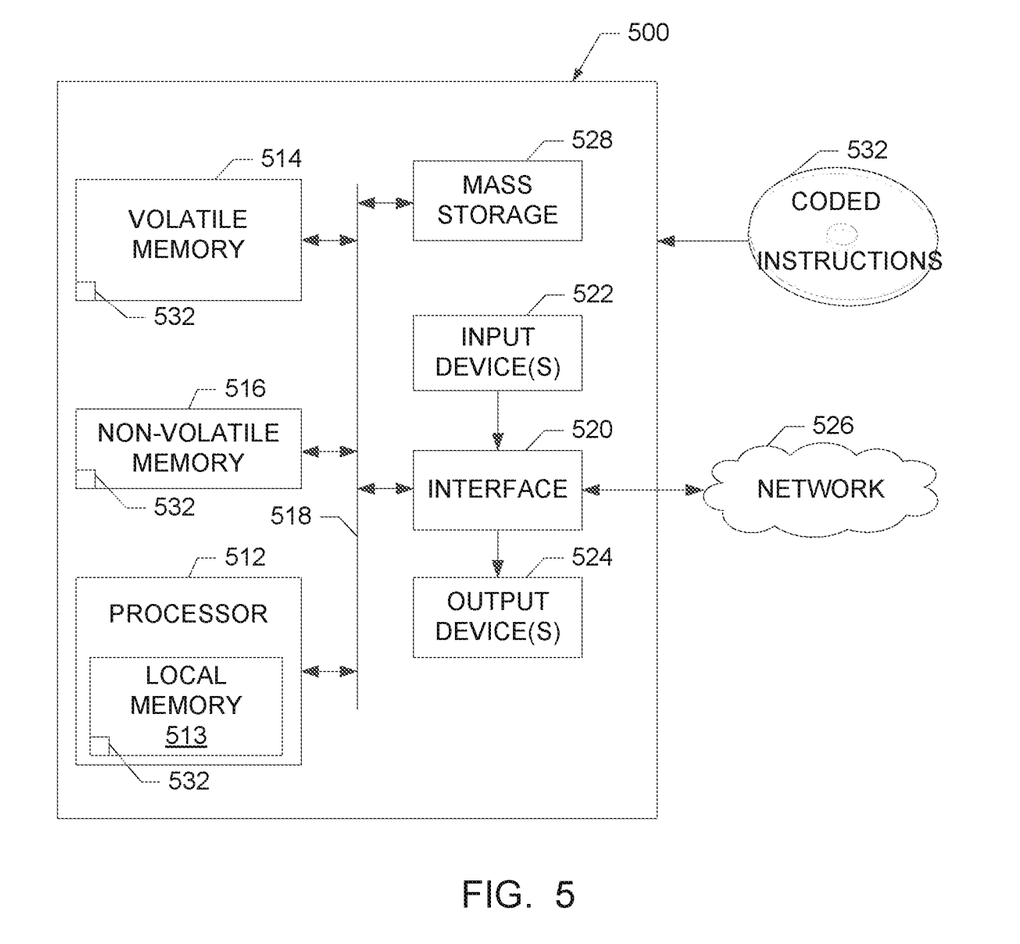
FIG. 5 is a diagram of an example processor platform that may be used to carry out the example method of FIG. 4 and/or, more generally, to implement the example system of FIG. 1.

FIG. 5 is a block diagram of an example processor platform 500 capable of executing instructions to implement the method of FIG. 4 and the example system 100 of FIGS. 1-3. The processor platform 500 can be, for example, a server, a personal computer, a mobile device (e.g., a cell phone, a smart phone, a tablet such as an iPad'), a personal digital assistant (PDA), an Internet appliance, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 of FIG. 5 may be stored in the mass storage device 528, in the volatile memory 514, in the non-volatile memory 516, and/or on a removable tangible computer readable storage medium such as a CD or DVD.

From the foregoing, it will be appreciated that the above disclosed systems, methods, and apparatus automatically generate alerts with respect to usage of the headlamps of a vehicle that are provided to a driver of the vehicle via a mobile device. The disclosed examples capitalize on data generated by the mobile device, such as time-of-day data, weather condition data, GPS location data, and/or ambient light condition data to evaluate the environment in which the vehicle is traveling and provide reminders to the driver to check the usage of the headlamps. In vehicles that do not include automatic headlamp systems, the disclosed examples provide for a real-time, rules-based evaluation of mobile device data to provide guidance to the driver with respect to headlamp usage.

In some examples, vehicle data received from the vehicle is used to provide customized decision-making with respect to whether or not to generate alerts. The disclosed examples identify patterns in headlamp usage by the driver, including high-beam headlight usage, and detect anomalous usage based on an evaluation of the patterns to determine whether alerts should be provided to the driver. In such examples, the vehicle data is integrated with the mobile device data during the application of one or more alert decision-making rules. Thus, the disclosed examples provide for intelligent analysis of data gathered from multiple sources, including the mobile device and the vehicle, to improve headlamp usage by drivers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    receiving, at a first processor of a mobile device, vehicle data, the vehicle data to be transmitted to the first processor from a second processor of a vehicle, the vehicle data including an operational status of headlamps of the vehicle;
    performing a comparison of the vehicle data to headlamp usage data, the headlamp usage data including a pattern of usage of the headlamps;
    analyzing mobile device data generated by the mobile device;
    generating an alert regarding usage of the headlamps of the vehicle in response to the comparison and the mobile device data; and
    presenting the alert via the mobile device.

2. The method of claim 1, wherein the vehicle data further includes one or more of a speed of the vehicle or an operational status of windshield wipers of the vehicle and the alert is to be further generated in response to the vehicle data including the one or more of the speed of the vehicle or the operational status of the windshield wipers.

3. The method of claim 1, wherein the mobile device data includes one or more of weather condition data, location data, time-of-day data, or ambient light data.

4. The method of claim 1, wherein presenting the alert includes presenting a text message or an audio message via the mobile device.

5. The method of claim 1, further including presenting the alert based on a user input setting received via the mobile device.

6. A method comprising:
    receiving, at a processor of a mobile device, first vehicle data, the first vehicle data to be transmitted to the processor of the mobile device from a processor of a vehicle;
    calculating an average duration of use of headlamps of the vehicle by a first driver of the vehicle based on the first vehicle data to generate average vehicle data for the first driver; and
    determining a deviation of the average vehicle data from second vehicle data, the second vehicle data associated with a duration of headlamp usage by a plurality of drivers;
    performing a comparison of the deviation to a threshold headlight duration value for the first driver;
    analyzing mobile device data generated by the mobile device;
    generating an alert for usage of the headlamps in response to the comparison and the mobile device data; and
    presenting the alert via the mobile device.

7. The method of claim 6, wherein the average vehicle data includes an average duration of use of high-beam headlights generated by the headlamps by the first driver.

8. The method of claim 7, further including determining the threshold headlight duration value based on the average duration use of the high-beam headlights.

9. The method of claim 6, wherein the mobile device data includes a condition for an environment in which the vehicle is located.

10. A method comprising:
receiving, via a first processor of a mobile device, vehicle data, the vehicle data to be transmitted to the first processor from a second processor of a vehicle;
identifying a pattern based on the vehicle data, the pattern associated with a use of headlamps of the vehicle;
analyzing mobile device data generated by the mobile device;
generating an alert in response to the pattern and the mobile device data; and
outputting the alert via the mobile device.

11. The method of claim 10, wherein the vehicle data includes an activation status of a high-beam headlight setting of the headlamps.

12. The method of claim 11, further including calculating a first duration value of the high-beam headlight setting based on the activation status.

13. The method of claim 12, wherein the vehicle data is first vehicle data and further including identifying the pattern based on the first duration value and a second duration value, the second duration value calculated from second vehicle data.

14. The method of claim 10, wherein the mobile device data includes an ambient light condition and further including:
detecting a low-light environment based on the ambient light condition; and
generating the alert in response to the detection of the low-light environment.

15. The method of claim 10, wherein the alert includes a message to activate the headlamps.

16. A method comprising:
receiving, via a processor of a mobile device, vehicle data, the vehicle data to be transmitted to the processor of the mobile device from a processor of a vehicle;
identifying a first pattern based on the vehicle data, the first pattern associated with a use of headlamps of the vehicle by a first driver;
calculating an anomaly value for use of the headlamps by the first driver based on the first pattern and a second pattern, the second pattern associated with headlamp usage by a plurality of drivers;
performing a comparison of the anomaly value to a threshold value, the threshold value associated with the first driver;
analyzing mobile device data generated by the mobile device;
generating an alert in response to the comparison and the mobile device data; and
outputting the alert via the mobile device.

17. An apparatus comprising:
a vehicle data receiver to receive first vehicle headlamp usage data for headlamps of a vehicle from a first processor of the vehicle;
a mobile device data receiver to receive mobile device data generated by a mobile device; and
a rules engine to:
analyze the first vehicle headlamp usage data, second vehicle headlamp usage data, and the mobile device data, the second vehicle headlamp usage data generated for the vehicle prior to the first vehicle headlamp usage data; and
generate an alert for headlamp usage of the vehicle based on the analysis, at least one of the vehicle data receiver, the mobile device data receiver, or the rules engine to be implemented via a second processor of the mobile device.

18. The apparatus of claim 17, wherein the rules engine is to identify an anomaly in the first vehicle headlamp usage data based on the second vehicle headlamp usage data and generate the alert in response to the anomaly.

19. The apparatus of claim 18, wherein the rules engine is to identify the anomaly based on a threshold value for usage of the headlamps of the vehicle.

20. The apparatus of claim 17, further including a user settings receiver to receive a user input via an interface of the mobile device, the user input including an alert setting.

21. The apparatus of claim 17, wherein the mobile device data includes a condition of an environment in which the vehicle is located and the rules engine is to:
apply a rule based on the first vehicle headlamp usage data, the second vehicle headlamp usage data, and the condition of the environment; and
generate the alert based on the application of the rule.

* * * * *